Patented Nov. 22, 1938

2,137,365

UNITED STATES PATENT OFFICE 2,137,365

NITROGENOUS FERTILIZER BASE AND PROCESS FOR PRODUCING THE SAME

Stanley Strong, Cockeysville, and William J. Gascoyne, Jr., Baltimore, Md., assignors, by mesne assignments, to William J. Gascoyne, Jr., Baltimore, Md.

No Drawing. Application February 1, 1937, Serial No. 123,520

12 Claims. (Cl. 71—18)

This invention is a nitrogenous fertilizer base and a process for producing the same from feathers.

An object of the invention is to provide a fertilizer base produced from feathers and having a substantial percentage of nitrogen in the form of water insoluble ammonia.

A further object of the invention is to provide such a fertilizer base in a dry, finely divided state, and which may be partially or entirely granular.

A still further object of the invention is to provide a process which is simple, economical, and results in a base which may be sold more cheaply than nitrogenous bases produced from materials other than feathers, and having a comparable water insoluble ammonia content.

Still another object of the invention is to produce from feathers an alkali digested mass of a character which is useful for purposes other than a fertilizer base, for example, for mixing with meat scrap to be used as animal feed.

It has long been recognized that feathers have a substantial nitrogen content in the organic form, but so far as we are aware, there has been no process capable of producing from feathers a fertilizer base having a water insoluble ammonia content which exceeds or is substantial in relation to the water soluble ammonia content or such a fertilizer base having the dry, finely divided and preferably granular form.

We have discovered that by subjecting feathers, preferably having a substantial moisture content, to heat and an alkali, they may be reduced to a gelatinous mass and that this mass, when acidified, has a water insoluble nitrogen content which is very substantial in relation to the water soluble nitrogen content. As will be understood, the nitrogen is present in the fertilizer in the form of compounds with other elements, and where we refer to nitrogen, therefore, we mean nitrogen compounds. We have further discovered that this alkali digested mass when acidified and mixed with a finely divided material, for example by mixing with a superphosphate or with a free acid and a finely divided material, will, when dried, afford a finely divided and largely, if not entirely, granular base material having a substantial water insoluble ammonia content.

We have found that the alkali treatment must be carefully controlled to avoid the production of a mass having a strongly alkaline reaction. For this purpose, the amount of alkali used should be the equivalent of approximately from 4 to 12% by weight of sodium hydroxide as compared to the weight of the dry feathers and preferably the percentage of alkali should be below 10%. If alkalies other than sodium hydroxide are used, their percentage will vary, depending upon their strength and relationship to sodium hydroxide, it being desirable to produce by the heat treatment a mass which is substantially neutral and in any event having a pH only slightly alkaline. In the presence of the alkali, the wet feathers are subjected to heat and preferably are agitated, the heat and period of treatment being regulated to produce a mass of mushy or gelatinous character in which the feathers as an entirety, including the quill, are reduced or digested. The mass thus obtained is useful not only as a fertilizer base, but may be included in other materials such as animal feeds; it may be mixed, for example, with meat scrap (cooked bones with the grease removed) and dried. Therefore, when we refer to this mass in the specification or claims as a fertilizer base, we do not intend to exclude such other uses.

When the gelatinous mass thus obtained is to be used as a fertilizer base, it is then acidified so that the nitrogenous compounds are precipitated and insolubilized to a substantial extent and the product is given a pH slightly on the acid side. We prefer to acidify by using a material which will increase the value of the final product; for example, by increasing the phosphoric acid content. For this purpose, we mix with the mass, superphosphate (acid phosphate) and dry the same, preferably while subjecting the mixture to agitation. By superphosphate we mean the product resulting from the treatment of finely ground phosphate rock with sulphuric acid (usually 52° Bé.), a process which renders most of the phosphoric acid soluble in water and weak organic acids, leaving only a small proportion of its original insoluble condition. Since the phosphoric acid content of a fertilizer base increases its value, this mixing of the alkali digested mass with superphosphate instead of finely divided material and free acid enhances the value of the final product. The drying and agitation are continued sufficiently to produce a relatively dry final product which is finely divided and which, preferably, is largely, if not entirely, granular. By relatively dry, we mean a moisture content substantially lower than the gelatinous mass when mixed with the finely divided material at atmospheric temperature. We find that if the moisture content is reduced to approximately ten percent, the material has the dryness desired.

Having thus generally described the product and the process, we will explain the same more precisely, simply by way of example.

Wet feathers are preferred, and the moisture content should be approximately from fifty to seventy-five percent so that the dry weight of the feathers is about twenty-five to fifty percent. Of course, these percentages may vary some. To one ton (2000 lbs.) by weight of wet feathers, having a moisture content such that the dry feather weight is approximately eight hundred pounds, we add sixty pounds of sodium hydroxide. The amount of sodium hydroxide may vary as above set forth from four to ten or twelve percent and as will be observed in this particular instance, we use approximately seven and one-half percent of sodium hydroxide based on the dry weight of the feathers. The feathers and alkali are digested in a steam drier at a temperature of approximately 200° F. for one hour. During the initial treatment the chamber is left open to permit temporarily the escape of volatile substances, but after a few minutes the chamber is closed and the digestion is continued simply in the presence of the moisture and such gases as may be evolved. The chamber is preferably heated without direct injection of steam into the mass; for instance, by external steam heating coils.

This treatment is continued until the mass is of mushy or gelatinous character and the characteristics of the feathers, including the quill, are substantially destroyed. As hereinbefore explained, the mass produced should be approximately neutral or not substantially on the alkaline side. The time and temperature conditions should be controlled, as well as the amount of caustic so that there will be no substantial loss or breaking down of the ammonia which should be preserved.

The chamber is then opened and we mix with the mass a suitable acidifying agent, such as superphosphate. In the example here given, we have used successfully four hundred pounds of superphosphate. With the valves of the chamber open, the mixture is then agitated and dried at a temperature of approximately 200° F. more or less until the mixture is sufficiently reduced. The final product has the desired characteristic if the mixture is reduced to approximately 10% and there results a base material which is relatively dry, finely divided, and which in many instances is largely, if not entirely, granular. A granular product is highly desirable due to its free flowing characteristics.

The product so produced has a water insoluble ammonia content in the neighborhood of approximately ten percent; in certain instances the water insoluble ammonia has been 9.40 as compared to a total ammonia of 10.66, and in other instances the water insoluble ammonia has been 10.76 as compared to a total ammonia content of 11.90. Generally the water insoluble ammonia content will vary from eight to twelve percent as compared to a water soluble ammonia content in the neighborhood of from one to two percent. The ammonia is also non-volatile so that in subsequent storage or shipment, there is no loss of nitrogen.

Moreover, the available phosphoric acid in the final product is in the neighborhood of five percent, generally exceeding this figure.

When referring to wet feathers, we do not intend to limit the invention to the use of feathers having any particular moisture content which will vary from fifty to seventy or seventy-five percent; the dry matter will vary from twenty-five to fifty percent.

Moreover, although we have referred to sodium hydroxide as the alkali, it will be understood that other alkalies may be used, such as potassium hydroxide, sodium carbonate, and lime salts. The percentages of these alkalies will vary considerably and the amounts to be used may be determined in each instance by the factors above explained.

Further, although we have mentioned the use of superphosphate as an acidifying agent, other acids or acid reacting materials may be used such as, for example, monocalcium phosphate, acid potassium sulphate, and even free acids, such as sulphuric, hydrochloric, tartaric and citric acids. When such free acids are employed, we prefer to use with them finely divided substances for mixing with the gelatinous mass to produce a granular or finely divided base material. The resultant finely divided or granular free flowing mass having a substantial water insoluble ammonia content may be mixed in any suitable proportions with other fertilizer materials, such as superphosphate, potash salt, ammonium sulphate, and nitrate of soda.

As will be understood, the nitrogen content of fertilizer is its important characteristic; nitrogen is always combined with other elements and may be present in one or more different organic forms.

We claim:

1. A process for producing from feathers a nitrogenous fertilizer base which comprises heating feathers in the presence of an alkali and moisture in such amount and under such conditions that substantially the entire final product is a gelatinous mass having a pH substantially neutral and having an available insoluble nitrogen content greater than the soluble nitrogen content but not less than approximately from 5 to 6.50%.

2. The process for producing from feathers a nitrogenous fertilizer base which comprises heating wet feathers in the presence of an alkali hydroxide in such amount and under conditions as to produce a gelatinous mass having a pH substantially neutral and having an available water insoluble nitrogen content in excess of the water soluble nitrogen content, and then acidifying by mixing the mass with an acidifying material to produce a mass having an available water insoluble nitrogen content in excess of the water soluble nitrogen content.

3. The process for producing from feathers a nitrogenous fertilizer base which comprises heating wet feathers in the presence of an alkali hydroxide in such amounts and under conditions as to produce a gelatinous mass having a pH substantially neutral and having an available water insoluble nitrogen content in excess of the water soluble nitrogen content, then acidifying by mixing the mass with an acidifying material and drying to produce a relatively dry, finely divided base material having a water insoluble nitrogen content in excess of the water soluble nitrogen.

4. The process for producing from feathers a nitrogenous fertilizer base which comprises heating wet feathers in the presence of an alkali equivalent to sodium hydroxide in a percentage of approximately from four to approximately twelve percent of the weight of the dry feathers and moisture in such amount and under such conditions as to reduce the quill and produce a relatively soft gelatinous mass and having an available water insoluble nitrogen content in excess of the water soluble nitrogen content, then acidifying by mixing the mass with an acidifying material, and drying to produce a relatively dry, finely divided base material having a water insoluble ammonia content in excess of the water soluble ammonia.

5. The process of producing from feathers a nitrogenous fertilizer base which comprises heating wet feathers in sodium hydroxide in an amount not exceeding approximately from four to approximately twelve percent of the weight of the dry feathers and moisture in such amount and under such conditions as to produce an available water insoluble nitrogen content in excess of the water soluble nitrogen contect, then acidifying by mixing the mass with an acidifying material and drying to produce a relatively dry, finely divided base material having an available water insoluble ammonia content in excess of the water soluble ammonia.

6. The process for producing from feathers a nitrogenous fertilizer base which comprises heating feathers in the presence of an alkali equivalent to sodium hydroxide in an amount not exceeding approximately from four to approximately twelve percent of the weight of the dry feathers and moisture in such amount and under such conditions as to produce an available water insoluble nitrogen content in excess of the water soluble nitrogen content, then acidifying the mass by mixing the same with superphosphate and drying to produce a relatively dry base material having an available water insoluble ammonia content in excess of the water soluble ammonia.

7. The process for producing from feathers a nitrogenous fertilizer base which comprises heating feathers in the presence of an alkali hydroxide and moisture in such amount and under such conditions as to produce a mass having a pH substantially neutral and having an available water insoluble nitrogen content in excess of the water soluble nitrogen content, and then mixing the mass with superphosphate and drying to produce a finely divided base material having an available water insoluble ammonia content in excess of the water soluble ammonia.

8. A process for producing from feathers a nitrogenous fertilizer base which comprises subjecting feathers in the presence of heat and substantially fifty to seventy-five percent moisture based on the dry weight of the feathers to an alkali hydroxide in an amount of substantially four to twelve percent of the dry weight of the feathers under such conditions as to produce a gelatinous mass having an available water insoluble nitrogen content substantially in excess of the water soluble nitrogen content.

9. A nitrogenous fertilizer base produced from feathers and containing available water insoluble nitrogen in excess of water soluble nitrogen, said insoluble nitrogen content being derived from the feathers, the base being produced by the process of claim 1.

10. A nitrogenous fertilizer base produced from feathers and containing available water insoluble nitrogen in excess of water soluble nitrogen, said insoluble nitrogen content being derived from the feathers, the base being produced by the process of claim 2.

11. A nitrogenous fertilizer base produced from feathers and containing available water insoluble nitrogen in excess of water soluble nitrogen, said insoluble nitrogen content being derived from the feathers, the base being produced by the process of claim 3.

12. A nitrogenous fertilizer base produced from feathers and containing available water insoluble nitrogen in excess of water soluble nitrogen, said insoluble nitrogen content being derived from the feathers, the base being produced by the process of claim 8.

STANLEY STRONG.
WILLIAM J. GASCOYNE, JR.